United States Patent
Chen et al.

(10) Patent No.: US 8,938,561 B2
(45) Date of Patent: Jan. 20, 2015

(54) TIME-SHARING BUFFER ACCESS SYSTEM

(71) Applicant: Skymedi Corporation, Hsinchu (TW)

(72) Inventors: Ting Wei Chen, Hsinchu (TW);
Hsingho Liu, Hsinchu (TW); Chuang Cheng, Hsinchu (TW)

(73) Assignee: Skymedi Corporation, Hsinchu (TW)

( * ) Notice: Subject to any disclaimer, the term of this patent is extended or adjusted under 35 U.S.C. 154(b) by 85 days.

(21) Appl. No.: 13/738,373

(22) Filed: Jan. 10, 2013

(65) Prior Publication Data
US 2014/0195701 A1 Jul. 10, 2014

(51) Int. Cl.
*G06F 12/00* (2006.01)
*G06F 3/06* (2006.01)
*G06F 13/00* (2006.01)

(52) U.S. Cl.
CPC ................................. G06F 3/0656 (2013.01)
USPC .............................. 710/52; 710/310; 711/147

(58) Field of Classification Search
CPC ................................... G06F 12/00; G06F 3/00
USPC ........................................ 710/52–58, 110, 310
See application file for complete search history.

(56) References Cited

U.S. PATENT DOCUMENTS

| | | | | |
|---|---|---|---|---|
| 4,860,193 A * | 8/1989 | Bentley et al. | ........... | 710/55 |
| 5,121,479 A * | 6/1992 | O'Brien | ........... | 710/34 |
| 5,179,665 A * | 1/1993 | Roslund et al. | ........... | 709/215 |
| 5,224,213 A * | 6/1993 | Dieffenderfer et al. | ........... | 710/53 |
| 5,293,486 A * | 3/1994 | Jordan et al. | ........... | 710/220 |
| 5,414,816 A * | 5/1995 | Oyadomari | ........... | 710/60 |
| 5,450,546 A * | 9/1995 | Krakirian | ........... | 710/57 |
| 5,561,823 A * | 10/1996 | Anderson | ........... | 710/52 |
| 5,729,708 A * | 3/1998 | Satoh et al. | ........... | 710/52 |
| 5,822,618 A * | 10/1998 | Ecclesine | ........... | 710/57 |
| 5,822,776 A * | 10/1998 | De Korte et al. | ........... | 711/167 |
| 5,832,306 A * | 11/1998 | Martin | ........... | 710/52 |
| 6,185,640 B1 * | 2/2001 | Ross | ........... | 710/53 |
| 6,629,168 B1 * | 9/2003 | Kroll et al. | ........... | 710/52 |
| 6,977,941 B2 * | 12/2005 | Takahashi et al. | ........... | 370/412 |
| 7,216,185 B2 * | 5/2007 | Kato | ........... | 710/52 |
| 7,353,344 B2 * | 4/2008 | Tsuiki | ........... | 711/154 |
| 7,450,457 B2 * | 11/2008 | Shiota et al. | ........... | 365/220 |
| 7,657,673 B2 * | 2/2010 | Ueda | ........... | 710/52 |
| 7,930,450 B1 * | 4/2011 | Swarnkar et al. | ........... | 710/52 |
| 8,635,386 B2 * | 1/2014 | Takahashi | ........... | 710/35 |
| 8,700,824 B2 * | 4/2014 | Brume et al. | ........... | 710/56 |
| 2003/0163620 A1 * | 8/2003 | Minami et al. | ........... | 710/62 |
| 2006/0149875 A1 * | 7/2006 | Dong et al. | ........... | 710/110 |
| 2008/0140883 A1 * | 6/2008 | Salessi et al. | ........... | 710/52 |
| 2012/0176842 A1 | 7/2012 | Shiota et al. | | |
| 2013/0013825 A1 * | 1/2013 | Muto | ........... | 710/56 |
| 2013/0179607 A1 * | 7/2013 | Brume et al. | ........... | 710/56 |

* cited by examiner

*Primary Examiner* — Christopher Shin
(74) *Attorney, Agent, or Firm* — Donald E. Stout; Stout, Uxa & Buyan, LLP

(57) ABSTRACT

A time-sharing buffer access system manages a buffer among plural master devices. Plural buffer handling units are operable to associatively couple the master devices, respectively, and a first end of each buffer handling unit is used to independently transfer data to or from the associated master device. A second end of each buffer handling unit is coupled to a buffer switch. A time slot controller defines a time slot, during which one of the buffer handling units is selected by the buffer switch such that data are only transferred between the selected buffer handling unit and the buffer.

15 Claims, 3 Drawing Sheets

TIME-SHARING BUFFER ACCESS SYSTEM

BACKGROUND OF THE INVENTION

1. Field of the Invention

The present invention generally relates to a buffer, and more particularly to a time-sharing buffer access system.

2. Description of Related Art

A data buffer or buffer is commonly used in electronic devices to temporarily hold data before the data is being moved from one place to another place. Regarding a flash memory controller, for example, a buffer such as static random-access memory (SRAM) is adopted to be accessed by master devices such as a host and/or a flash memory. The host and the flash memory may probably be in conflict as both want to access the buffer at the same time. A priority rule is commonly adopted to solve the conflict problem. Specifically, the master devices are assigned with respective priorities, such that a master device with lower priority should wait for other master devices with higher priority to finish their tasks or release their access rights. Therefore, the conventional flash memory control is low in overall performance of the master devices accessing the buffer.

In order to overcome the problems mentioned above, a need has thus arisen to propose a novel scheme of managing buffer access in an efficient manner.

SUMMARY OF THE INVENTION

In view of the foregoing, it is an object of the embodiment of the present invention to provide a time-sharing buffer access system for managing a buffer among plural master devices in order to efficiently manage buffer access.

According to one embodiment, a time-sharing buffer access system includes a plurality of buffer handling units, a buffer switch and a time slot controller. The buffer handling units are operable to associatively couple master devices, respectively. A first end of each buffer handling unit is used to independently transfer data to or from the associated master device. A second end of each buffer handling unit is coupled to the buffer switch. The time slot controller is configured to define a time slot, during which one of the buffer handling units is selected by the buffer switch such that data are only transferred between the selected buffer handling unit and the buffer.

According to another embodiment, a memory controller includes a front-end device, a back-end device, a central processing unit (CPU), a buffer and a time-sharing buffer access system. The front-end device is configured to communicate with a host, and the back-end device is configured to communicate with a non-volatile memory. The buffer is operable to be accessed among the front-end device, the back-end device and the CPU. The time-sharing buffer access system is configured to simultaneously transfer data to or from the front-end device, the back-end device and the CPU, and to allocate dedicated time slots respectively and exclusively for the front-end device, the back-end device and the CPU in turn for transferring data between the time-sharing buffer system and the buffer.

DETAILED DESCRIPTION OF THE INVENTION

Figure 1:
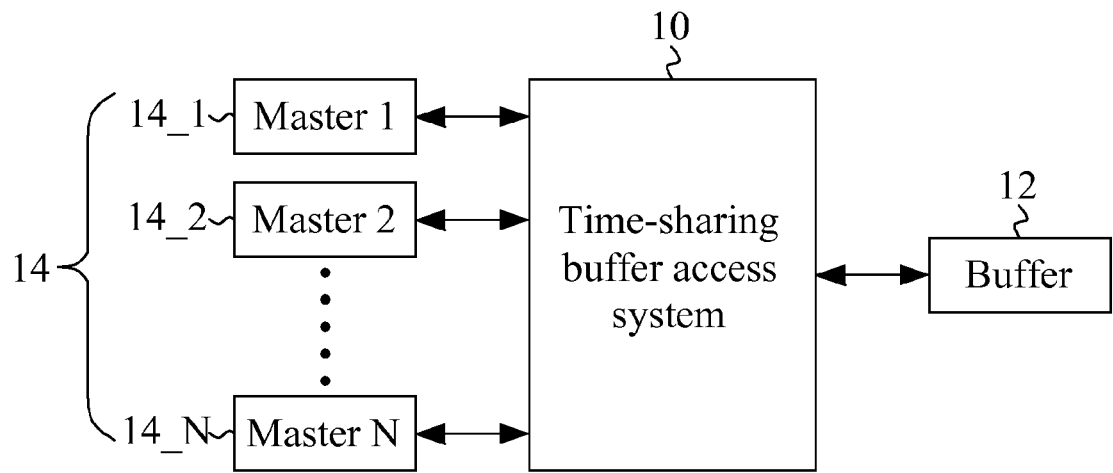
FIG. 1 shows a block diagram illustrating a time-sharing buffer access system for managing a buffer among plural master devices according to one embodiment of the present invention.

FIG. 1 shows a block diagram illustrating a time-sharing buffer access system 10 for managing a buffer (or memory storage) 12 among plural master devices 14_1, 14_2, ... and 14_N (or collectively designated as 14) according to one embodiment of the present invention. The buffer 12 of the embodiment may be, but not limited to, a static random-access memory (SRAM). According to one aspect of the embodiment, the time-sharing buffer access system (or "system") 10 is capable of simultaneously transferring data to/from (i.e., to or from) all the master devices 14, and allocating dedicated time slots respectively for the master devices 14 in turn. Accordingly, within each time period, one or more time slots are allocated exclusively for accessing the buffer 12 with respect to each of the master devices (14_1, 14_2, ... and 14_N). During the allocated time slot(s), only data with respect to an associated master device (14_1, 14_2, ... or 14_N) may be transferred between the system 10 and the buffer 12. As mentioned above, all the master devices 14 may simultaneously, if required, communicate with the system 10. As a result, no master device (14_1, 14_2, ... or 14_N) need wait for other master devices to finish their tasks or release their access rights, as in a conventional system. Therefore, overall performance of the master devices 14 accessing the buffer 12 may thus be substantially improved.

Figure 2:
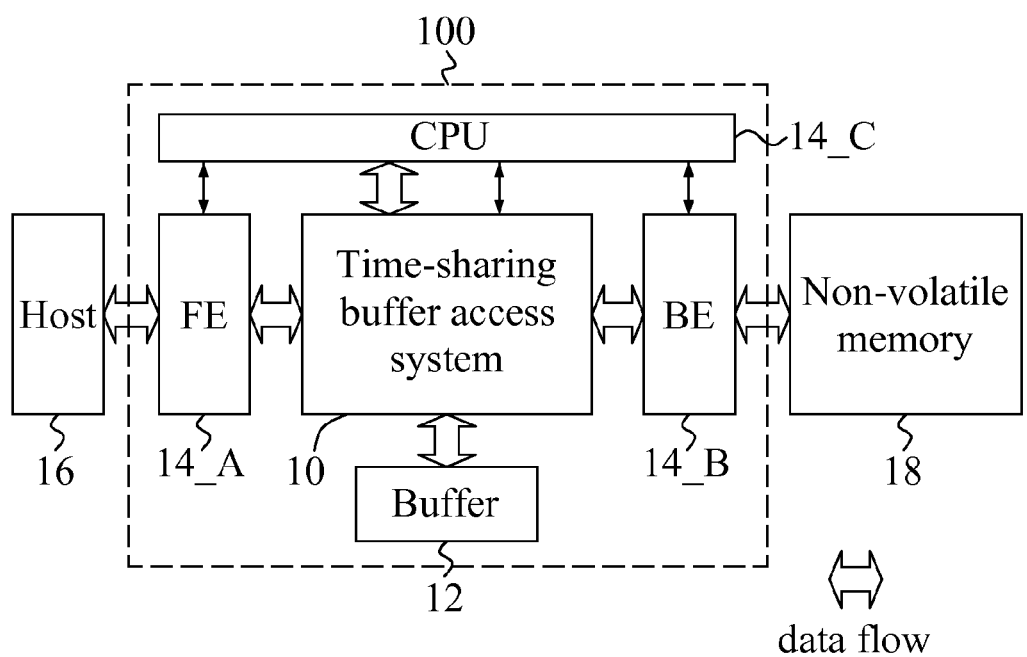
FIG. 2 shows an exemplary embodiment that adopts the architecture of FIG. 1.

FIG. 2 shows an exemplary embodiment that adopts the architecture of FIG. 1. In the present embodiment, the time-sharing buffer access system (or "system") 10 is coupled to three master devices: a front-end (FE) device 14_A, a back-end (BE) device 14_B and a central processing unit (CPU) 14_C. The system 10, the buffer 12, the front-end device 14_A, the back-end device 14_B and the CPU 14_C together form a memory controller 100 for managing data flow between a host 16 (e.g., a computer) and a non-volatile memory 18 (e.g., flash memory).

In the embodiment, the front-end device 14_A is configured to communicate with the host 16 to act as an interface between the host 16 and the system 10. The back-end device 14_B is configured to communicate with the non-volatile memory 18 to act as an interface between the non-volatile memory 18 and the system 10.

In one example, each time period may be divided to three time slots, of which the first time slot may be allocated to the front-end device 14_A, the second time slot, to the back-end device 14_B, and the third time slot to the CPU 14_C. Accordingly, during the first time slot, only data with respect to the associated front-end device 14_A (and the host 16) may be transferred between the system 10 and the buffer 12; during the second time slot, only data with respect to the back-end device 14_B (and the non-volatile memory 18) may be transferred between the system 10 and the buffer 12; and during the third time slot, only data with respect to the associated CPU 14_C may be transferred between the system 10 and the buffer 12. The time period of the embodiment may, but not necessarily, correspond to one or more clock cycles. In another example, each time period may be divided to four time slots, of which the first time slot may be allocated to the front-end device 14_A, the second and the third time slots to the back-end device 14_B, and the fourth time slot to the CPU 14_C.

Figure 3:
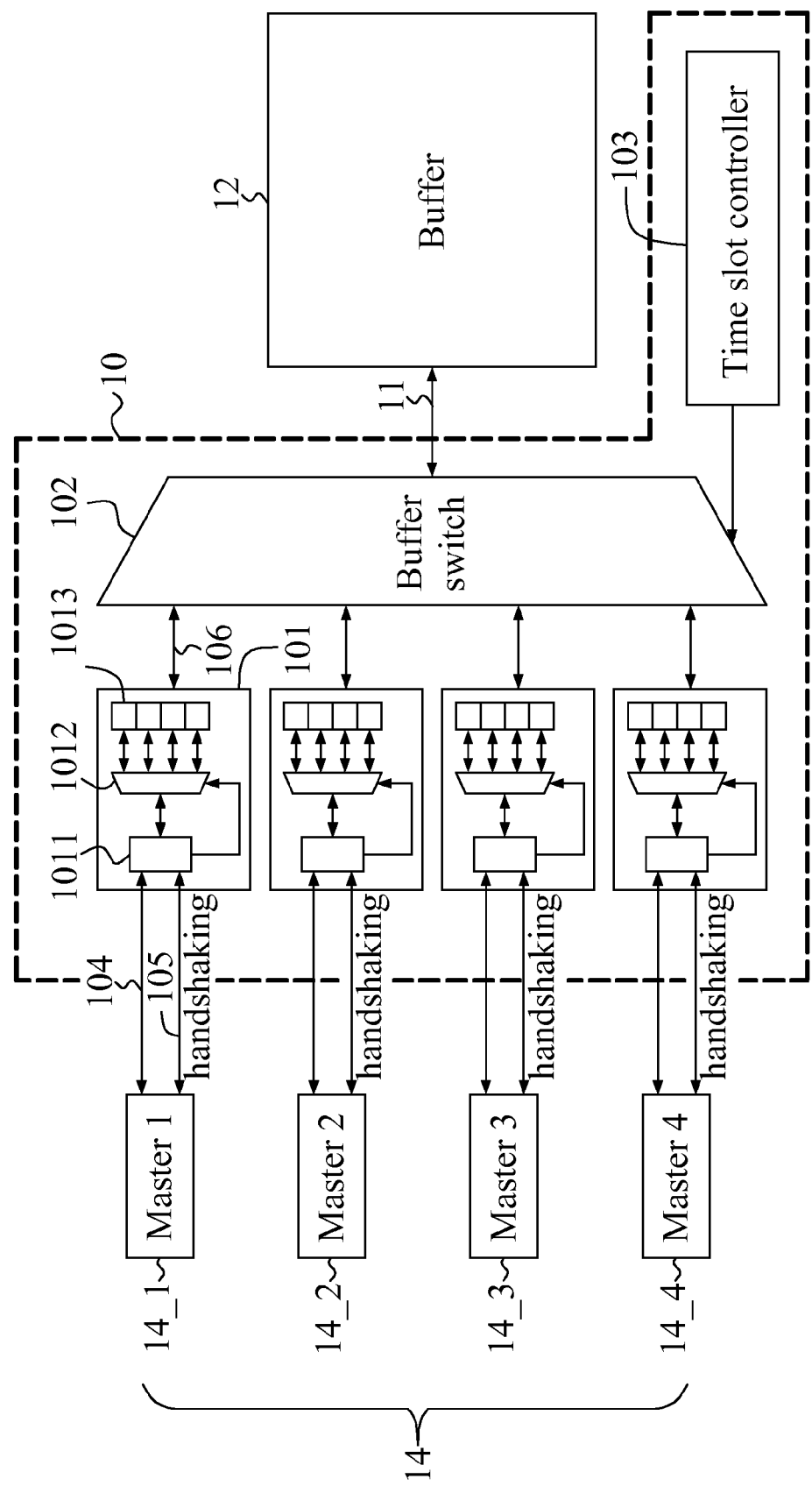
FIG. 3 shows a detailed block diagram of FIG. 1.

FIG. 3 shows a detailed block diagram of FIG. 1. Although four master devices 14_1, 14_2, 14_3 and 14_4 (or collectively designated as 14) are exemplified in the figure, it is appreciated that the number of master devices is not limited to that shown. In the embodiment, the time-sharing buffer access system (or "system") 10 includes plural buffer handling units 101 (four buffer handling units are shown here), which are operable to couple the master devices 14, respectively. A first end of each buffer handling unit 101 may be used to independently transfer data to/from the associated master device (14_1, 14_2, 14_3 or 14_4). A second end of each buffer handling unit 101 is coupled to a buffer switch 102. During a time slot defined by a time slot controller 103 (e.g., a counter), one of the four buffer handling units 101 is selected by the buffer switch 102 in a time slot, such that data may be transferred between the selected buffer handling unit 101 and the buffer 12.

As shown in FIG. 3, each buffer handling unit 101 includes a data transfer unit 1011, a transfer switch 1012 and a transfer buffer 1013. Specifically speaking, the data transfer unit 1011 negotiates to establish a communication channel 104, at the first end, with the associated master device (14_1, 14_2, 14_3 or 14_4) by handshaking on a handshaking bus 105. After establishing the communication channel 104, data may be transferred between the associated master device (14_1, 14_2, 14_3 or 14_4) and the data transfer unit 1011. The transfer buffer 1013 may be composed of plural data blocks, one of which may be selected by the transfer switch 1012 such that data may be transferred, via the transfer switch 1012, between the transfer buffer 1013 and the data transfer unit 1011. The transfer buffer 1013 is operable, at the second end, to couple the buffer switch 102 via a transfer bus 106. When the buffer handling unit 101 is selected by the buffer switch 102, data may thus be transferred, via the buffer switch 102, between the associated transfer buffer 1013 and the buffer 12.

Figure 4:
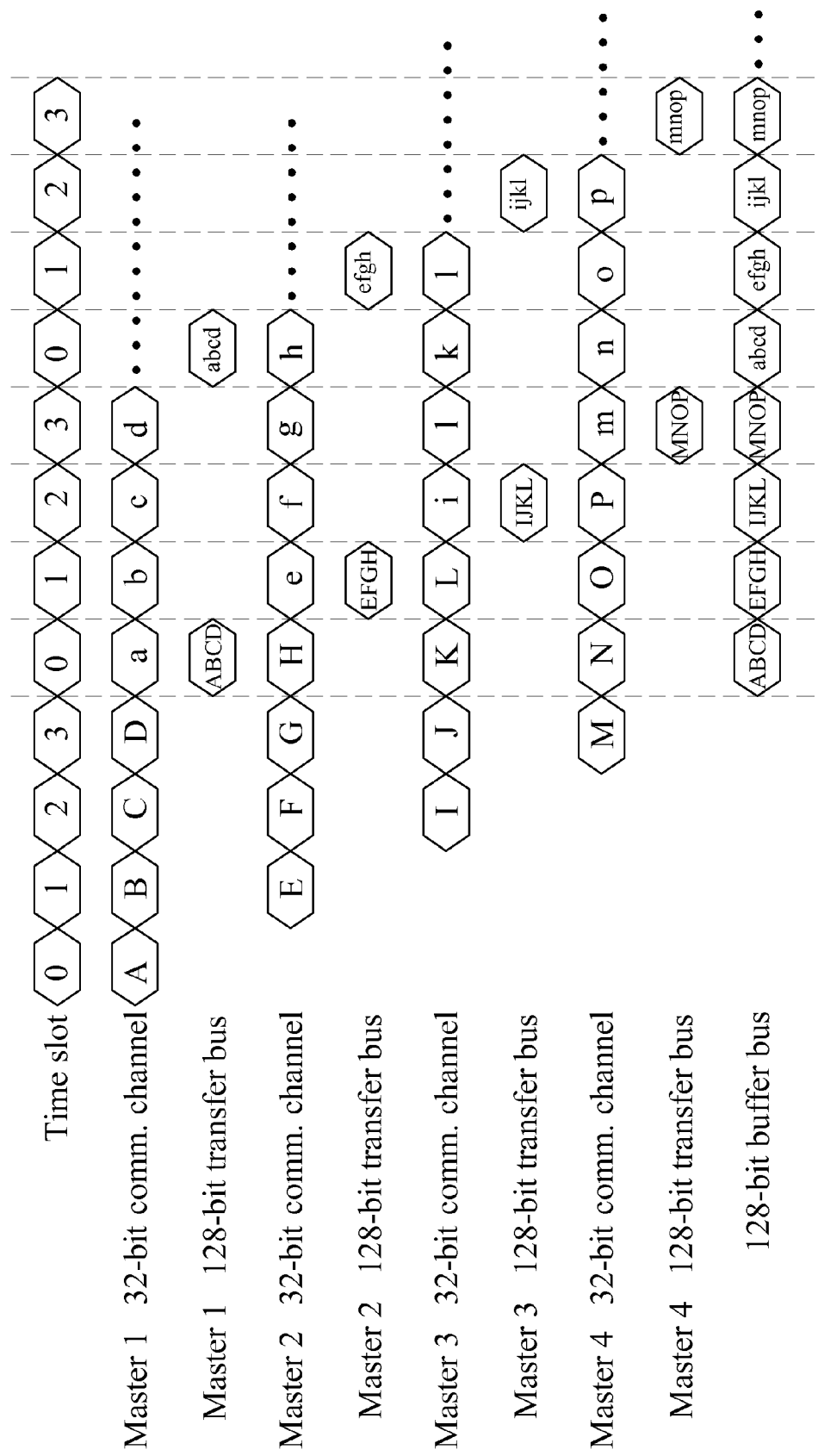
FIG. 4 shows an exemplary data transfer diagram of FIG. 3.

In one example, the communication channel 104 is a 32-bit channel, such that 32-bit data may be transferred at a time. The transfer buffer 1013 is composed of four data blocks, each being 32-bit wide, therefore resulting in a 128-bit transfer buffer 1013. Accordingly, 128-bit data may be transferred at a time, via the buffer switch 102, between the buffer handling unit 101 and the buffer 12. FIG. 4 shows an exemplary data transfer diagram. As demonstrated in FIG. 4, the master devices 14 need not wait for other master devices to finish their task or release their access rights. Data are temporarily stored in the transfer buffer 1013 while the associated buffer handling unit 101 is not selected by the buffer switch 102. Upon selecting the buffer handling unit 101, 128-bit data, which are four times the 32-bit data on the communication channel 104, may thus be transferred on transfer bus 106 between the associated buffer handling unit 101 and the buffer 12, via the buffer switch 102. For example, with respect to the master 1 (14_1), 32-bit data A, B, C and D are transferred in sequence on the associated 32-bit communication channel 104 one time slot at a time. The 128-bit data composed of the four 32-bit data A, B, C and D are transferred on a 128-bit buffer bus 11 (between the buffer switch 102 and the buffer 12) during the allocated time slot 0. The other master devices 14_2, 14_3 and 14-4 operate in a similar manner using their respective allocated time slots. Generally speaking, if each time period is divided to N time slots, the data width on the transfer bus 106 (or the buffer bus 11) is N times the data width on the communication channel 104.

Although specific embodiments have been illustrated and described, it will be appreciated by those skilled in the art that various modifications may be made without departing from the scope of the present invention, which is intended to be limited solely by the appended claims.

What is claimed is:

1. A time-sharing buffer access system for managing a buffer among a plurality of master devices, the system comprising:
   a plurality of buffer handling units operable to associatively couple the master devices, respectively, a first end of each said buffer handling unit being used to transfer data to or from the associated master device independently of other master devices to simultaneously transfer data from all the master devices or to simultaneously transfer data to all the master devices;
   a buffer switch, to which a second end of each said buffer handling unit is coupled; and
   a time slot controller configured to define a time slot, during which one of the buffer handling units is selected by the buffer switch such that data are only transferred between the selected buffer handling unit and the buffer.

2. The system of claim 1, wherein the buffer comprises a static random-access memory (SRAM).

3. The system of claim 1, wherein one or more time slots are allocated exclusively for the master devices in turn.

4. The system of claim 1, wherein the time slot controller comprises a counter.

5. The system of claim 1, wherein the buffer handling unit comprises:
   a data transfer unit configured to establish a communication channel, at the first end, with the associated master device;
   a transfer switch; and
   a transfer buffer including a plurality of data blocks, one of which is selected by the transfer switch such that data are transferred, via the transfer switch, between the transfer buffer and the data transfer unit, the transfer buffer being operable, at the second end, to couple the buffer switch via a transfer bus.

6. The system of claim 5, wherein the data transfer unit establishes the communication channel by handshaking with the associated master device.

7. The system of claim 5, wherein a time period is divided to N time slots, and data width on the transfer bus is N times data width on the communication channel.

8. A memory controller, comprising:
   a front-end device configured to communicate with a host;
   a back-end device configured to communicate with a non-volatile memory;
   a central processing unit (CPU);
   a buffer operable to be accessed among the front-end device, the back-end device and the CPU; and
   a time-sharing buffer access system configured to simultaneously transfer data to the front-end device, the back-end device and the CPU or to simultaneously transfer data from the front-end device, the back-end device and the CPU, the time-sharing buffer access system being configured to allocate dedicated time slots respectively and exclusively for the front-end device, the back-end device and the CPU in turn, for transferring data between the time-sharing buffer system and the buffer.

9. The memory controller of claim 8, wherein the buffer comprises a static random-access memory (SRAM).

10. The memory controller of claim 8, wherein one or more time slots are allocated exclusively for the front-end device, the back-end device and the CPU in turn.

11. The memory controller of claim 8, wherein the time-sharing buffer access system comprises:

a plurality of buffer handling units operable to associatively couple the front-end device, the back-end device and the CPU, respectively, a first end of each said buffer handling unit being used to transfer data to or from an associated one of the front-end device, the back-end device and the CPU independently of others of the front-end device, the back-end device and the CPU;

a buffer switch, to which a second end of each said buffer handling unit is coupled; and a time slot controller configured to define a time slot, during which one of the buffer handling units is selected by the buffer switch such that data are only transferred between the selected buffer handling unit and the buffer.

12. The memory controller of claim 11, wherein, the buffer handling unit comprises:

a data transfer unit configured to establish a communication channel, at the first end, with the associated front-end device, the back-end device or the CPU;

a transfer switch; and a transfer buffer including a plurality of data blocks, one of which is selected by the transfer switch such that data are transferred, via the transfer switch, between the transfer buffer and the data transfer unit, the transfer buffer being operable, at the second end, to couple the buffer switch via a transfer bus.

13. The memory controller of claim 12, wherein the data transfer unit establishes the communication channel by handshaking with the associated front-end device, the back-end device or the CPU.

14. The memory controller of claim 12, wherein a time period is divided to N time slots, and data width on the transfer bus is N times data width on the communication channel.

15. The memory controller of claim 11, wherein the time slot controller comprises a counter.

* * * * *